US006790043B2

(12) United States Patent
Aboud

(10) Patent No.: US 6,790,043 B2
(45) Date of Patent: Sep. 14, 2004

(54) METHOD AND APPARATUS FOR SURGICAL TRAINING

(75) Inventor: Emad T. Aboud, Swaida (SY)

(73) Assignee: Board of Trustees of the University of Arkansas, Little Rock, AR (US)

( * ) Notice: Subject to any disclaimer, the term of this patent is extended or adjusted under 35 U.S.C. 154(b) by 57 days.

(21) Appl. No.: 10/339,053

(22) Filed: Jan. 9, 2003

(65) Prior Publication Data

US 2003/0186203 A1 Oct. 2, 2003

Related U.S. Application Data

(60) Provisional application No. 60/368,458, filed on Mar. 28, 2002.

(51) Int. Cl.[7] .............................................. G09B 23/28
(52) U.S. Cl. ..................... 434/268; 434/262; 434/267
(58) Field of Search ................................ 434/262, 269, 434/270, 272, 268, 267

(56) References Cited

U.S. PATENT DOCUMENTS

| | | |
|---|---|---|
| 2,752,697 A | 7/1956 | Lawall |
| 2,871,579 A | 2/1959 | Niiranen et al. |
| 3,027,655 A | 4/1962 | Alderson |
| 3,892,628 A | 7/1975 | Thorne et al. |
| 4,182,054 A | 1/1980 | Wise et al. |
| 4,642,055 A | 2/1987 | Saliterman |
| 4,666,425 A | 5/1987 | Fleming |
| 4,773,865 A | 9/1988 | Baldwin |
| 5,215,469 A | 6/1993 | Kohnke et al. |
| 5,320,537 A | 6/1994 | Watson |
| 5,326,706 A | 7/1994 | Yland et al. |
| 5,425,644 A | 6/1995 | Szinicz |
| 5,494,822 A | 2/1996 | Sadri |
| 5,620,326 A | 4/1997 | Younker |
| 5,634,797 A | 6/1997 | Montgomery |
| 5,725,516 A | 3/1998 | Cook et al. |

(List continued on next page.)

OTHER PUBLICATIONS

Garrett, H., A Human Cadaveric Circulation Model, Journal of Vascular Surgery, May 2002, vol. 33, No. 5, pp. 1128–1130.

(List continued on next page.)

Primary Examiner—Derris H. Banks
Assistant Examiner—Dmitry Suhol
(74) Attorney, Agent, or Firm—Ray F. Cox, Jr.

(57) ABSTRACT

An apparatus and method for microsurgical training using cadaveric anatomy with filling of the vascular system by fluids under pressure to simulate the appearance and function of live surgery. One or more arteries on the specimen of cadaveric anatomy are cannulated and connected to an arterial reservoir having a flexible container holding an arterial fluid simulating the appearance of blood circulating in the arteries of the living organism from which the cadaveric anatomy is derived. Suitable static pressure simulating the arterial pressure appropriate to that of the living organism is applied to the air in an air-tight space surrounding the flexible container in the arterial reservoir. A pulsating machine provides air pulsations to the space surrounding the flexible fluid container to simulate the normal pulsations of the arterial system. One or more veins on the specimen are also cannulated and connected to a venous reservoir having a flexible container holding a venous fluid simulating the appearance of blood circulating in the veins of the living organism. Suitable static pressure simulating the venous pressure appropriate to that of the living organism is applied to the air in an air-tight space surrounding the flexible container in the venous reservoir. Optionally, if the specimen includes at least a portion of spinal canal, a clear fluid reservoir can be connected to the specimen through the spinal canal to simulate cerebrospinal fluid.

16 Claims, 13 Drawing Sheets

U.S. PATENT DOCUMENTS

| | | | | |
|---|---|---|---|---|
| 5,873,863 A | * | 2/1999 | Komlosi et al. | 604/259 |
| 5,951,301 A | | 9/1999 | Younker | |
| 6,062,866 A | | 5/2000 | Prom | |
| 6,234,804 B1 | | 5/2001 | Yong | |
| 6,488,507 B1 | * | 12/2002 | Stoloff et al. | 434/272 |
| 6,517,354 B1 | * | 2/2003 | Levy | 434/262 |
| 2001/0019818 A1 | | 9/2001 | Yong | |

OTHER PUBLICATIONS

Austin, G., et al., A Laboratory Model for Vascular Microsurgery, *Journal of Oral & Maxillofacial Surgery*, Jul. 1983, 41(7): p. 450–5.

Ovid: Bibliographic Records, Abstract, Cheong, J., The Use of Animals in Medical Education: A Question of Necessity vs. Desirability, *Theoretical Medicine*, Mar. 1989, 1 page.

Di Cataldo, A., et al., Experimental Research and Surgery: Why, How, and When?, *Microsurgery*, 2001, 21(4), p. 118–120.

Ovid: Bibliographical Records, Abstract, English, D., Using Animals for the Training of Physicians and Surgeons, *Theoretical Medicine*, Mar. 1989, 1 page.

Eppley, B., An Animal Model for Advanced Microsurgical Training, *Journal of Oral & Maxillofacial Surgery*, Oct. 1986, 44(10): p. 833–6.

Eppley, B., The Epigastric Fat Transfer: An Alternative Free Flap Model in the Rat, *Annals of Plastic Surgery*, Oct. 1992, 29(4): p. 293–4.

Fanua, S., Alternative Model for Teaching Microsurgery, *Microsurgery*, 2001, 21(8): p. 379–82.

Ovid: Bibliographic Records, Abstract, Freys, S., et al., Education and Training in Microsurgery without Experiments on Live Animals, *Handchirurgie, Mikrochirurgie, Plastiche Chirurgie*, Jan. 1988, 20(1), 1 page.

Ovid: Bibliographic Records, Abstract, Fuhse, J., et al., Experimental Microsurgery on Animal in Preparation for Fertility Surgery of the Reproductive System in Men, *Zeitschrift fur Urologie and Nephrologie*, May 1982, 75(5), 1 page.

Gibo. H., et al., Microsurgical Anatomy of the Middle Cerebral Artery, *Journal of Neurosurgery*, 1981, 54, p. 151–169.

Hamlyn, P., Neurovascular Relationships in the Posterior Cranial Fossa, With Special Reference to Trigeminal Neuralgia, *Clinical Anatomy*, 1997, 10, p. 371–388.

Ovid: Bibliographic Records, Henriques, J. et al., Abstract, Microsurgical Anatomy of Sellar Region in Cadavers Using a Photographic Technique with Fluorescein, *Arquivos de Neuro–psiquitria*, Jun. 2000, 58(2B), 1 page.

Ovid: Bibliographic Records, Kaufman, C. et al., Abstract, Trauma Training: Virtual Reality Applications, *Studies in Health Technology & Informatics*, 2001, 81, 1 page.

Khodadad, G., et al., Repair and Replacement of Small Arteries, Microsuture Technique, *Journal of Neurosurgery*, 1965, 23: p. 61–69.

Lannon, D., et al., Non–Vital, Prosthetic, and Virtual Reality Models of Microsurgical Training, *Microsurgery*, 2001, 21(8): p. 389–93.

Ovid: Bibliographic Records, Abstract, Miklic, P., et al., Intercarotid Anastomosis with a Vein Graft in the Rat. A Model for Microsurgical Training, *Arquivos de Neuro–Psiquiatria*, Jun. 1980, 38(2), 1 page.

Oelsner, G., et al., The Effect of Training in Microsurgery, *American Journal of Obstetrics & Gynecology*, Aug. 15, 1985, 152(8): p. 1054–1057.

O'Sullivan, E., et al., An Improved Composition for Embalming Fluid to Preserve Cadavers for Anatomy Teaching in the United Kingdom, *Journal of Anatomy*, 1993, 182: p. 295–297.

Ovid: Bibliographic Records, Abstract, Remie, R., The PVC–Rat and other Alternatives in Microsurgical Training, *Lab Animal*, Oct. 2001, 30(9), 1 page.

Salamon, G., et al., Topographic Investigation of the Cortical Branches of the Middle Cerebral Artery, *Acta Radiologica Diagnosis*, 1972, 13(1): p. 226–232.

Sampei, T., et al., Anatomic Study of Anterior Frontal Cortical Bridging Veins with Special Reference to the Frontopolar Vein, *Neurosurgery*, May 1996, 38(5): p. 971–975.

Sanan, A., et al., Colored Silicone Injection for Use in Neurosurgical Dissections: Anatomic Reference Note, *Neurosurgery*, Nov. 1999, 45(5): p. 1267–1274. (including Diaz, J., Comment, p. 1271–1272, and Smith, R., Comment, p. 1272–1273.).

Krishnamurthy, S., et al., The Use of Fabric Softener in Neurosurgical Prosections, *Neurosurgery*, Feb. 1995, 36(2): p. 420–424.

Seoane, E., et al., Suprameatal Extension of the Retrosigmoid Approach: Microsurgical Anatomy, *Neurosurgery*, Mar. 1999, 44(3): p. 553–560.

Synckers, F., Transsphenoidal Selective Anterior Hypophysectomy in Cats for Microsurgical Training, *Journal of Neurosurgery*, Dec. 1975, 43(6): p. 774–7.

Ovid: Bibliographical Records, Abstract, Steube, D., et al., A Model for Microsurgical Interference of the Rat Cranium, *Zeitscrift fur Experimentelle Chirurgie, Transplantation, und Kunstliche Organe*, 1988, 21(6), 1 page.

Ovid: Bibliographic Records, Abstract, Yen, D., et al, New Model for Microsurgical Training and Skills Maintenance, *Microsurgery*, 1995, 16(11), 1 page.

Ovid: Bibliographic Records, Abstract, Yenidunya, M., et al., Microsurgical Training with Beads, *Journal of Reconstructive Surgery*, Apr. 1998, 14(3), 1 page.

Yonekawa, Y., et al., Laboratory Training in Microsurgical Techniques and Microvascular Anastomosis, *Operative Techniques in Neurosurgery*, Sep. 1999, 2(3): p. 149–158.

Ovid: Bibliographic Records, Abstract, Zarabini, A., et al., From Surgical Gloves to the Rat. The Various Stages of Microsurgery Training, *Minerva Chirurgica*, 55(10), 1 page.

Website, www.optimist.at, Pulsating Organ Perfusion, Optimist Handelsges.m.b.H., Bregenz, Austria, Published at least as early as Aug. 20, 2002, 11 pages.

Brasil, A., et al., Anatomy of Liliequist's Membrane, Neurosurgery, vol. 32 No. 6, Jun. 1993, pp. 956–961.

Umansky, F., et al., Microsurgical anatomy of the proximal segments of the middle cerebral artery, J. Neurosurg., vol. 61, Sep. 1984, pp. 458–467.

Waddington, M., Intraluminal Diameters of Middle Cerabral Branches for Microanastomoses, Neurol Res 1:65–76, 1979.

Yasargil, M., Microsurgery, vol. 1, Microsurgical Anatomy of the basal cistern and vessels, New York Thieme Medical Publishers, 1984, p. vi–vii.

Aboud, E., et al., New Laboratory Model for Neurosurgical Training that Simulates Live Surgery, J Neurosurg 97:1367–1372, Dec. 2002.

Website, http://www.calf.vetmed.ucdavis.edu, Practical Methodology–Vascular Access Models, School of Veterinary Medicine, UC–Davis, Davis, California, Printed from website on Dec. 12, 2002, Published at least as early as Aug. 2002, 4 pages.

Brochure, Microneurosurgical Training under Life–like Conditions, University of Arkansas for Medical Sciences, Little Rock, Arkansas, Published Sep. 5, 2002, 2 pages.

Website, http://www.uams.edu/today, College of Medicine Makes Microsurgery Breakthrough Using $1 Pump, University of Arkansas for Medical Sciences, Little Rock, Arkansas, Nov. 26, 2002, 3 pages.

New Surgical Teaching Method Devised, Arkansas Democrat–Gazette, Nov. 27, 2002, p. 6B.

Buyukmihci, N., Non–Violence in Surgical Training, printed from website www.avar.org, Association of Veterinarians for Animal Rights, Davis, California, Copyright date 1989–2002, 7 pages.

Reuthebuch, O., et al., Advanced Training Model for Beating Heart Coronary Artery Surgery: the Zurich Heart–Trainer, European Journal of Cardio–Thoracic Surgery, vol. 22, Elsevier Science B.V., 2002, pp. 244–248.

* cited by examiner

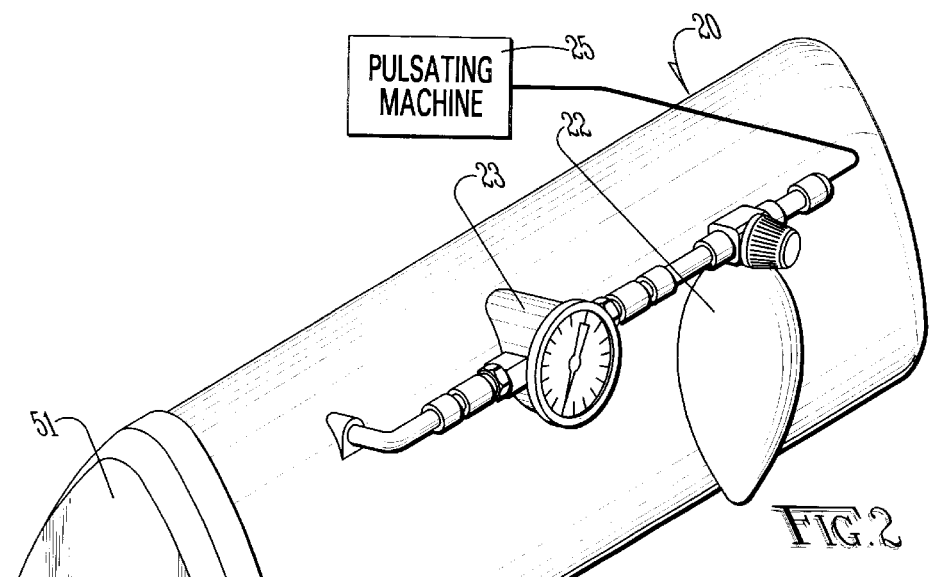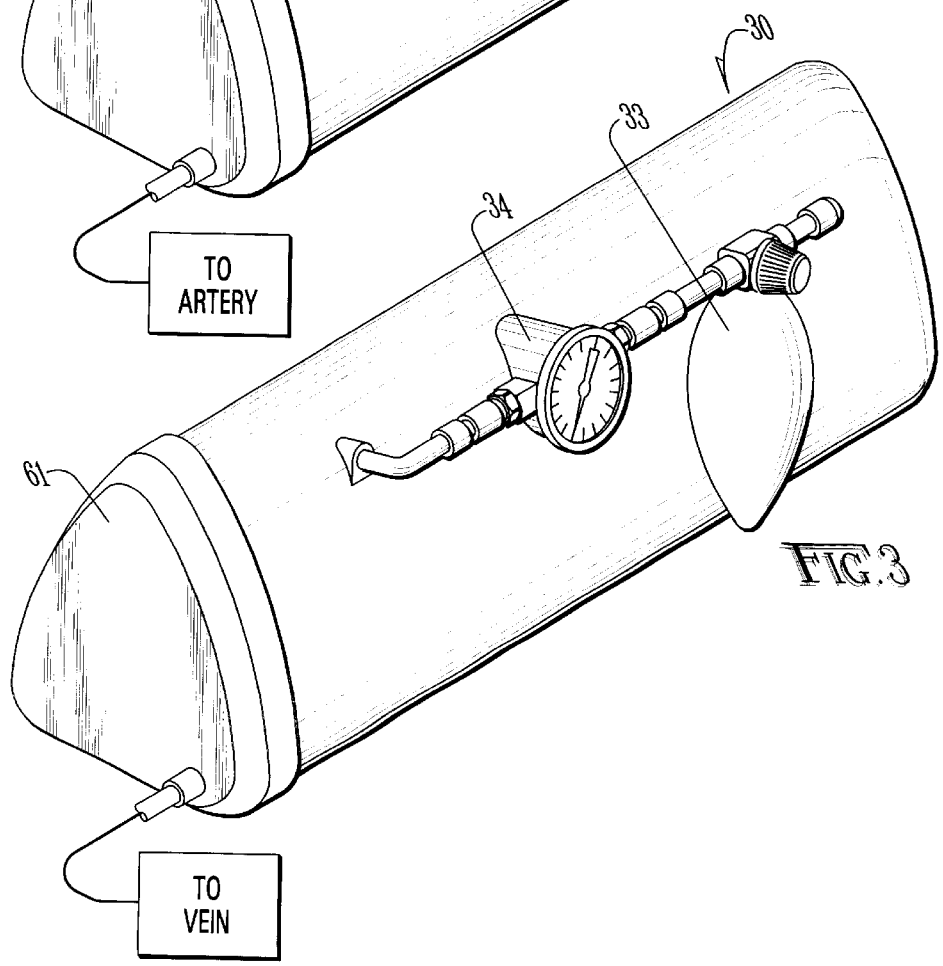

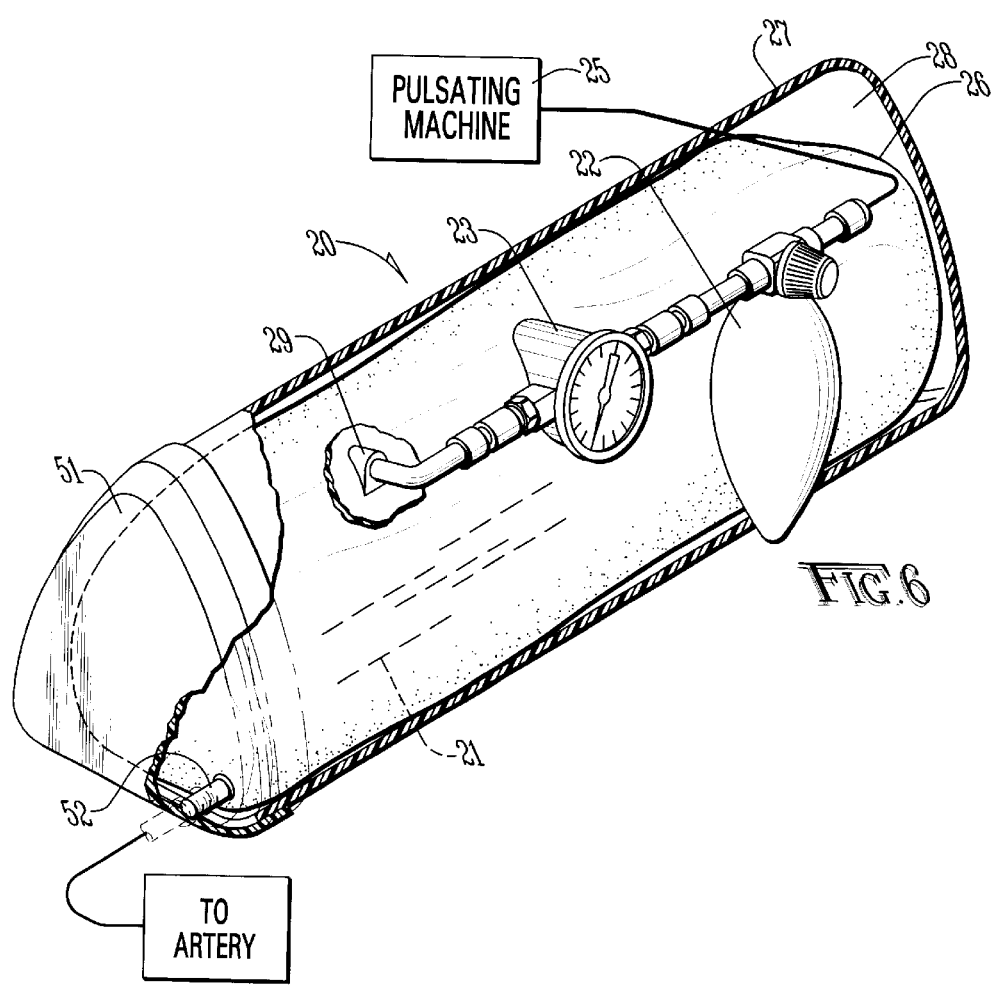

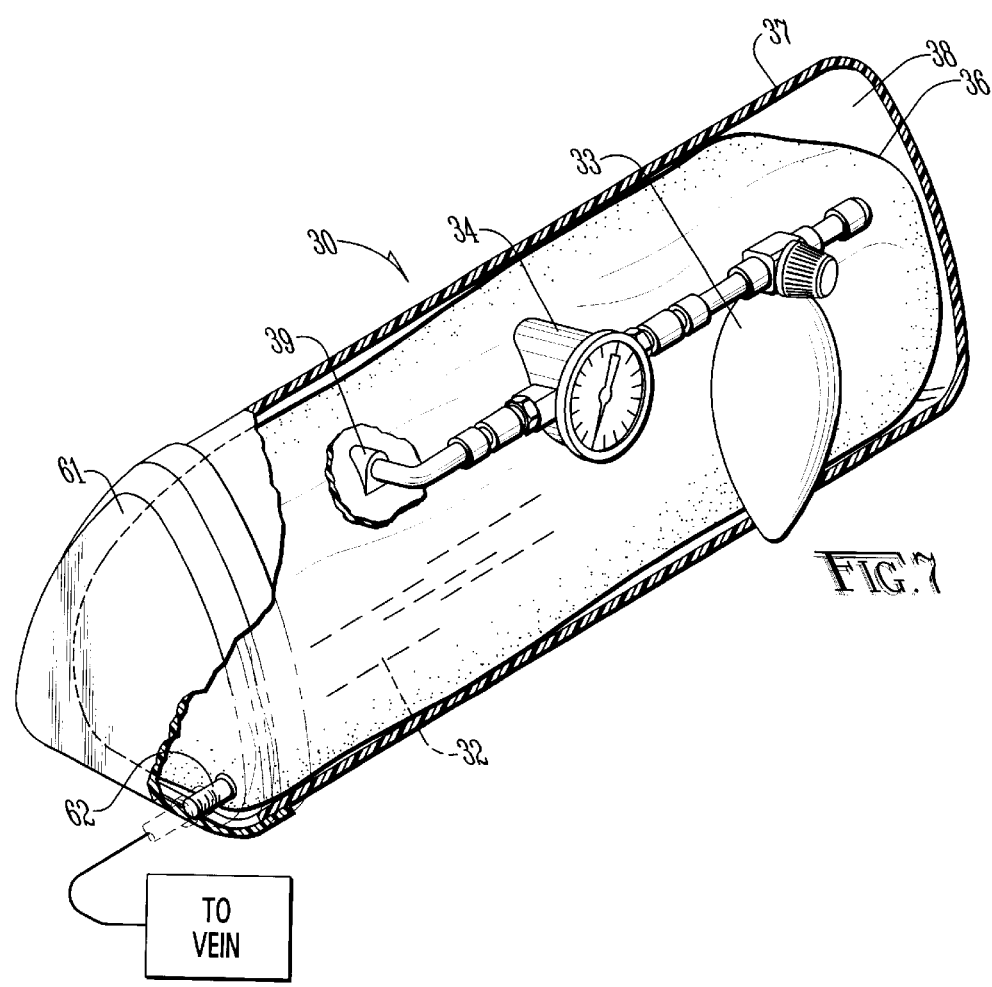

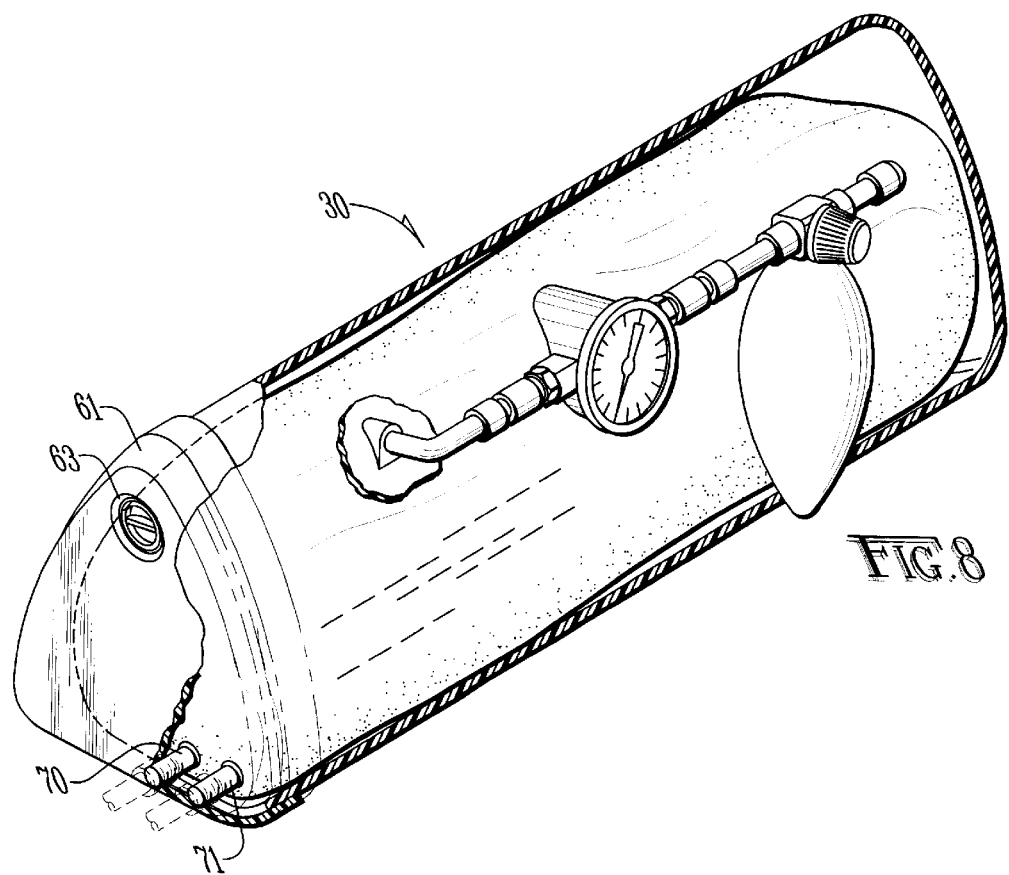

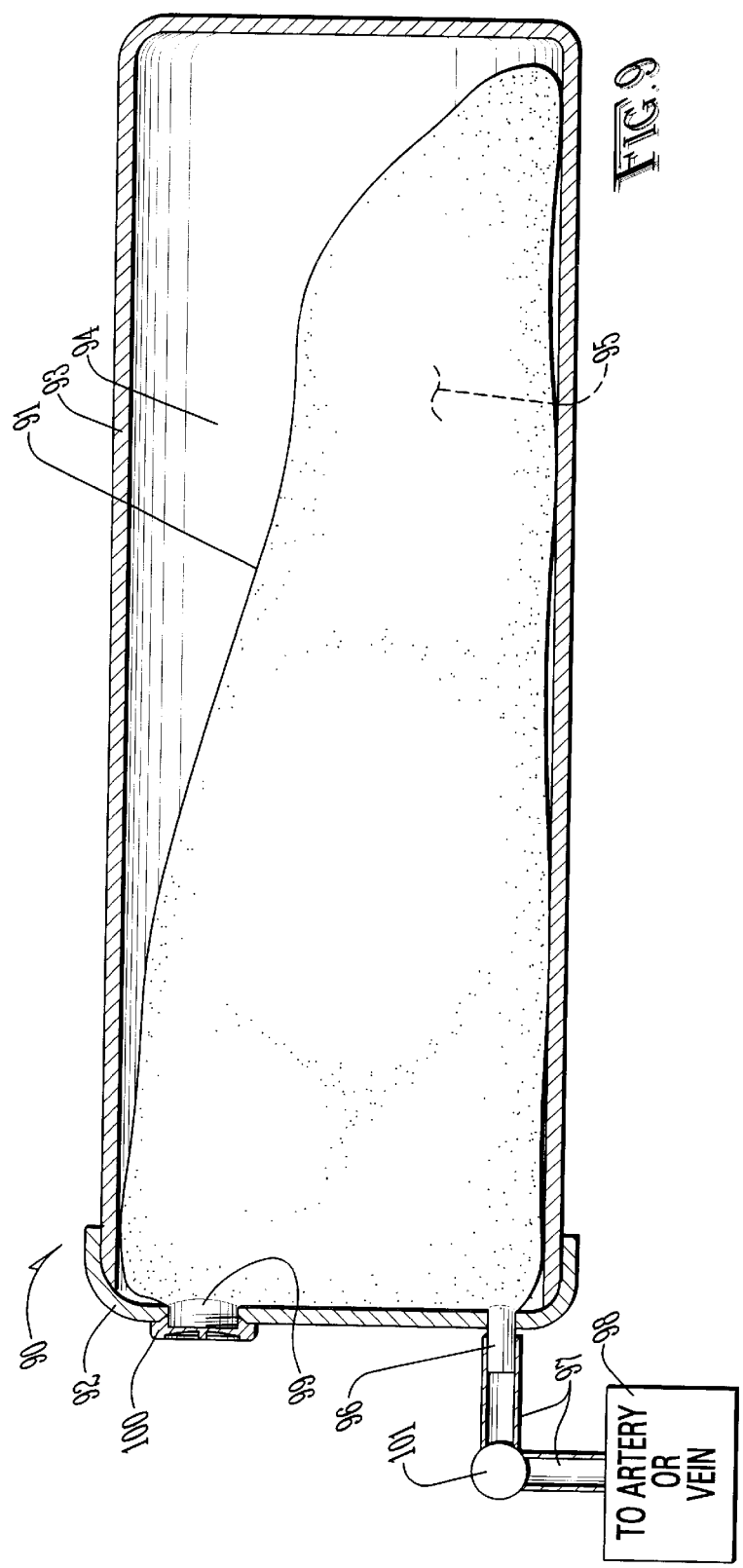

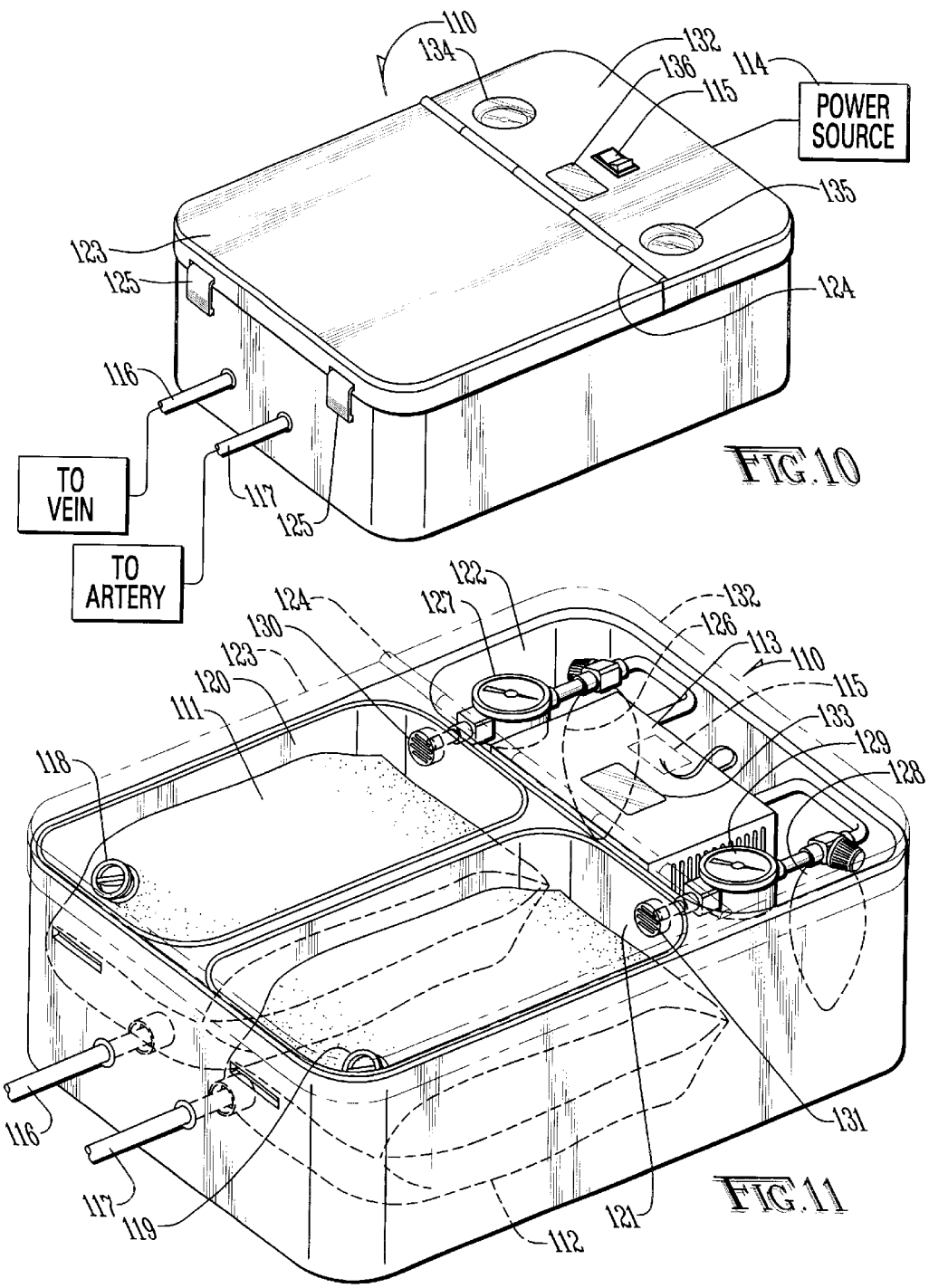

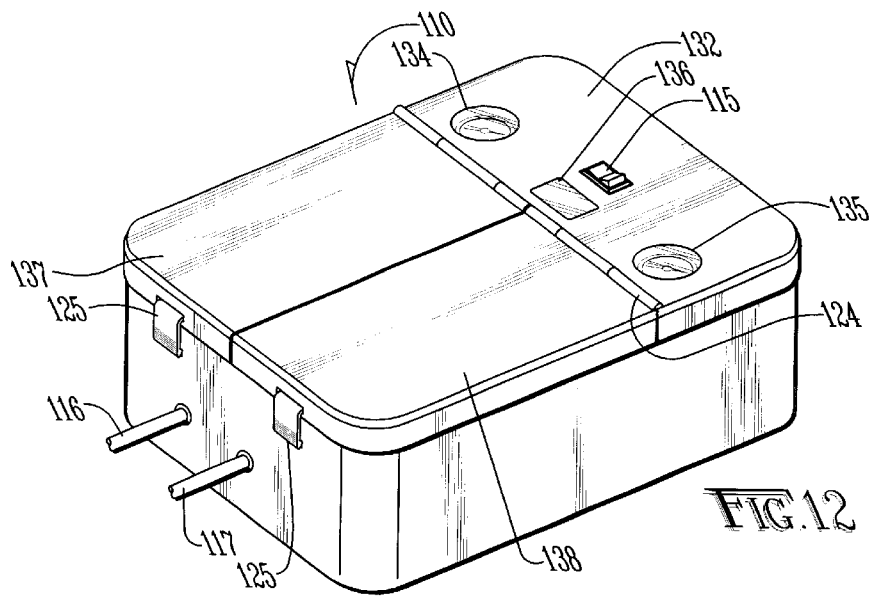
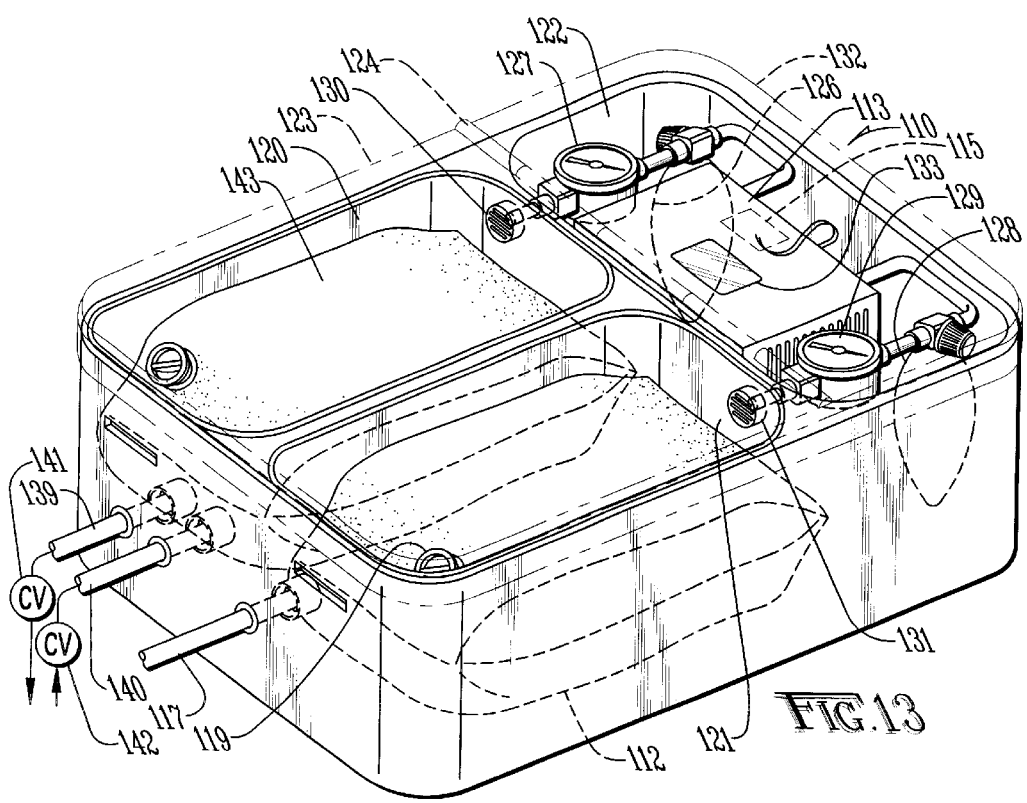

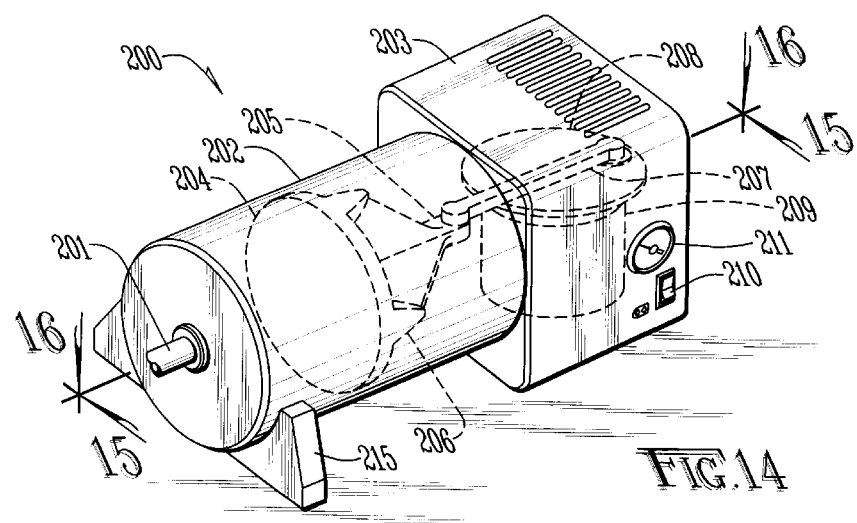
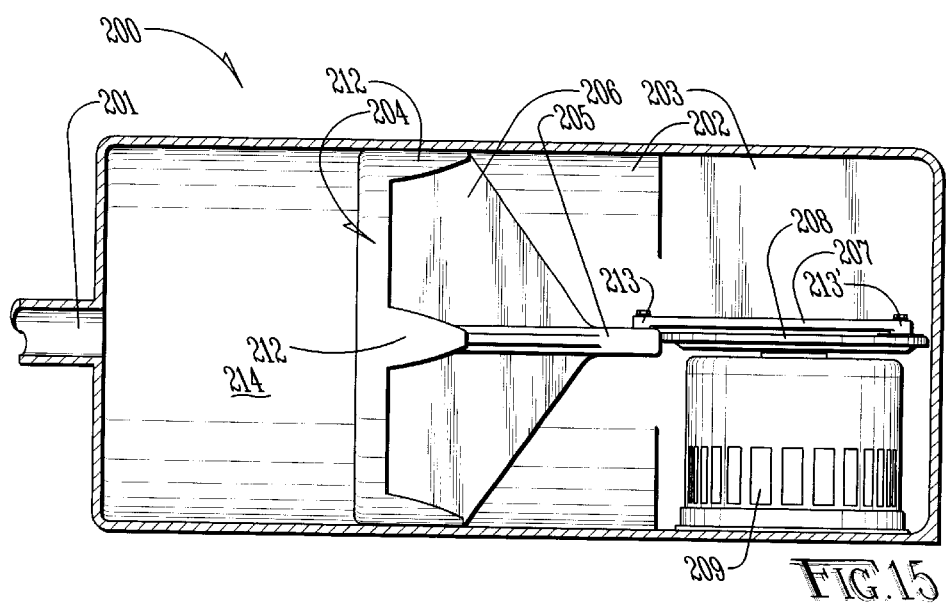

METHOD AND APPARATUS FOR SURGICAL TRAINING

CROSS-REFERENCE TO RELATED APPLICATIONS

This application claims the benefit of U.S. Provisional Application No. 60/368,458 filed Mar. 28, 2002.

STATEMENT REGARDING FEDERALLY SPONSORED RESEARCH OR DEVELOPMENT

Not applicable.

BACKGROUND OF THE INVENTION

1. Field of the Invention

The present invention relates to devices and methods for surgical training, and in particular, to such devices and methods which are useful in training on microvascular and microsurgical procedures on both human and animals.

2. Brief Description of the Related Art

Laboratory training models are essential for developing and refining surgical skills, especially for microsurgery. The closer to live surgery the model is, the greater the benefit. At present, training is limited to artificial models that simulate human anatomy, anesthetized live animals and cadavers, but none of them reliably mimic the anatomy and the characteristics of the vascular tree and tissue in the human and animal anatomy during live surgery, in particular, hemorrhage. Training models using a portion of animal anatomy are known, but even with such a model, training is limited to a few procedures and cannot replicate the experience of "skin-to-skin" procedures, i.e., from opening to closing. Cadaver models injected with colored silicone, gelatin, or any other congealed material lack bleeding, pulsation and fluid vascular filling, which allow manipulation of the vessels, hemostasis, clipping, or suturing. On the other hand, live anesthetized animals do not represent true human anatomy, apart from the ethical considerations involved in the use of live animals in surgical training.

Microsurgery, and especially neurosurgery, demands the development of dexterity and skill for both basic and fine procedures and techniques. In particular, in organs such as the central nervous system or vascular system, the surgeon's individual skills play a crucial role in determining the outcome. Hence, the emphasis has been on laboratory training in preparing people for the operating room experience. (Yasargil M G, Microneurosurgery, Microsurgical anatomy of the basal cistern and vessels of the brain. New York: Thieme Medical Publishers, 1984, Volume 1, p. vi). The fine manipulation and dissection of the vessels with anastomosis are usually practiced on live anesthetized animals or artificial models. (Yonekawa Y, Frick R, Roth P, Taub E, Imhof H-G: Laboratory Training in Microsurgical Techniques and Microvascular Anastomosis. Oper Tech Neurosurg 2:149–158, 1999.). Unfortunately, these are limited to simple techniques and have no relation to the actual anatomy or surgical crises that are encountered by the trainee in live surgery. A critical part of this training is mastering the anatomy.

To improve the illustrative value of cadaveric dissection, colored materials are injected into the vessels of cadavers to identify the arteries and veins for anatomical studies. Fluorescein and radiopaque substances, silicone, gelatin, latex, acrylic, or tinted polyester resin have been used for this purpose. (Gibo H, Carver C C, Rhoton A L Jr, Lenky C, Mitchell R J: Microsurgical anatomy of the middle cerebral artery; J Neurosurg 54:151–169, 1981; Sanan A, Abdel Azez K M, Janjua R M, van Loveren H R, Keller, J T: Colored silicone injection for use in neurosurgical dissection: anatomic technical note. Neurosurgery 45:1267–1274, 1999; Smith R, Rhoton A L Jr: Comment. Neurosurgery 45:1272–1273, 1999; Umansky F, Juarez S M, Dujovny M, Ausman J I, Diaz F G, Ray W J: Microsurgical anatomy of the proximal segments of the middle cerebral artery. J Neurosurg 61:458–467, 1984; Diaz J: Comment. Neurosurgery 45:1271–1272, 1999.).

Mechanical pressure pumps have been used to introduce and perfuse embalming fluids via the common carotid or femoral arteries (Coleman R, Kogan I: An improved low formaldehyde embalming fluid to preserve cadavers for anatomy teaching. J Anat 192:443–446, 1998; O'Sullivan E, Mitchell B S: An improved composition for embalming fluid to preserve cadavers for anatomy teaching in the United Kingdom. J Anat 182:295–297, 1993.). Mechanical pumps have also been used to introduce liquids into artificial training models or into portions of animal anatomy as described in U.S. Pat. No. 5,425,644 to Szinicz.

In studying the role of neurovascular compression in trigeminal neuralgia, Hamlyn described injection filling of cadaveric vessels to determine the neurovascular relationships in the posterior fossa (Hamlyn P J: Neurovascular relationship in the posterior fossa, with special reference to trigeminal neuralgia. 1. Review of the literature and development of a new method of vascular injection and filling. Clin Anat 10:371–379, 1997.).

Various attempts have been made to preserve living organs using various combinations of pumps, conduits and fluid reservoirs connected to the vascular system of the organ. See, for example, U.S. Pat. Nos. 4,666,425; 5,326,706; 5,494,822; and 3,892,628.

Training models with means to simulate the behavior of blood or other fluids in the human body are known from U.S. Pat. Nos. 6,234,804; 5,951,301; 5,634,797; 5,620,326; 5,320,537; 5,215,469; 4,773,865; 3,027,655; 4,182,054; 2,871,579; 2,752,697; and Published Patent Application U.S.2001/0019818A1. The disclosed devices employ simulations of living anatomy and are generally limited to one or a few procedures. While such models may be valuable in the early stages of training, they are less effective for higher level training in surgical procedures.

U.S. Pat. No. 5,425,644 to Szinicz for a "Surgical Training Apparatus and Method" discloses an apparatus for training in surgical procedures. It includes a pump, tubing, and a fluid-containing reservoir connected to non-living animal tissue, such as organs obtained from a slaughterhouse. The fluid is preferably an approximation to "the physical properties of blood, e.g., in viscosity, density, and color. The fluid flows through the non-living animal tissue and exits to the reservoir from which it is recirculated by the pump. In one embodiment, the pump is a peristaltic flow type to provide a pulsating fluid flow. Alternatively, a fluid interrupter creates a pulsating flow. Pressure gauges may be employed to monitor and regulate the pressure of the circulating fluid.

The references mentioned above are not admitted to be prior art with respect to the present invention. The described references suffer from various limitations, which are overcome by the present invention as described below.

BRIEF SUMMARY OF THE INVENTION

The present invention is a device and method for microsurgical training. Current laboratory training models, while essential for developing surgical skills, are limited in their effectiveness, especially with microvascular procedures. Training using cadavers lacks the bleeding, pulsation and fluid filling of the vascular system which is required for realistic training in vascular procedures. The alternative is to use live anesthetized animals, which do not represent true human anatomy and have ethical issues with regard to the use of live animals for surgical training.

The present invention overcomes the limitations of the prior surgical training models by using cadaveric anatomy, preferably human cadaveric anatomy for medical training and animal cadaveric anatomy for veterinary training, with filling of the vascular system by fluids under pressure to simulate the appearance and function of live surgery. Whether human or animal, it is desirable that the cadaveric anatomy be embalmed using known methods to extend its usefulness for a period of time.

This approach may be used with the whole cadaveric specimen or with a portion of cadaveric anatomy, such as the head, arm or leg, or an organ, such as the heart, liver or brain. One or more arteries on the specimen of cadaveric anatomy are cannulated and connected to an arterial reservoir containing a red colored fluid. The arterial reservoir is further connected to a pulsating machine which provides pulsating pressure to simulate the normal pulsations of the arterial system. The fluid in the reservoir is maintained at a pressure similar to that in the living subject from which the cadaveric anatomy is obtained. However, the pressure is adjustable as needed to accommodate various procedures practiced on, or conditions in, the cadaveric anatomy.

One or more veins on the specimen are also cannulated and connected to a venous reservoir of blue or dark red colored fluid. The venous reservoir is maintained at a pressure similar to that of the living subject from which the cadaveric anatomy is obtained in order to simulate vein filling but no pulsation is applied. However, the pressure in the venous reservoir may be adjusted if another pressure is desirable for a particular procedure or exercise. The venous reservoir and the arterial reservoir along with the pulsating pressure machine and ancillary equipment may be incorporated into a unitary container.

Finally, a clear fluid reservoir can be connected to the specimen. For example, in the case of the cadaveric head or other specimen of cadaveric anatomy having a spinal canal, one or more tubes may be introduced into the spinal canal and connected to the clear fluid reservoir with adjustable flow to simulate cerebrospinal fluid.

The cadaveric specimen so prepared may be used for training on various surgical procedures, including surgical approach, suturing and repair of the vessels, aneurysm clip application, catheterisation, tumor resection, cadaveric dissection, etc. The present invention may also be used in training on and testing of new medical devices, medical, veterinary and nursing school training, residency training, and anatomical studies. As used herein, the term "surgical training procedures" refers to any of the procedures, training, testing or studies mentioned above.

The colored fluid used in the invention may be water that is colored with food dyes. However, in order to more fully simulate the vascular system, the colored fluid employed in the procedure may be thickened to more closely mimic the viscosity of normal blood.

The fluids that are used to fill the arteries and veins of the specimen of cadaveric anatomy do not circulate through a pump. Instead means are provided for the application of static air pressure to flexible fluid containers so that the pressure is applied indirectly to the arterial and venous systems. Likewise, the pulsating pressure for the arterial system is provided by applying pulsating air pressure to the flexible fluid containers.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 2 is a perspective view of an arterial fluid reservoir.

FIG. 3 is a perspective view of a venous fluid reservoir.

FIG. 6 shows an embodiment of the arterial fluid reservoir and the connection to the artery. The fluid reservoir comprises a flexible inner container enclosed within a rigid air-tight outer container.

FIG. 7 shows an embodiment of the venous fluid reservoir and the connection to the vein. The fluid reservoir comprises a flexible inner container enclosed within a rigid air-tight outer container.

FIG. 8 shows an alternative embodiment of the fluid reservoirs having both an inlet and an outlet with oppositely-directed one-way valves for the fluids and an opening for filling the reservoir. In this embodiment, the fluid reservoir may be used as a pump for circulating fluid through the cadaveric anatomy and only one colored fluid is used.

FIG. 9 is a cross-sectional elevation view of an embodiment of a fluid reservoir showing the relationship between the flexible inner container, the cover and the rigid air-tight outer container.

FIG. 10 is a perspective view of an alternative embodiment of the present invention having a unitary rigid container incorporating both the venous fluid inner container and the arterial fluid inner container along with the pulsating pressure machine and the means of applying static pressure to both the arterial and the venous fluid inner containers.

FIG. 11 is a perspective view of the unitary rigid container of FIG. 10 with covers removed to show the placement of the venous fluid inner container and the arterial fluid inner container, the pulsating pressure machine and the means of applying static pressure to both the arterial and the venous fluid inner containers. Pressure is applied to the air in the space surrounding the flexible inner containers and from the flexible inner containers the pressure is transmitted to the cadaveric anatomy. The fluid in the inner containers and the cadaveric anatomy is kept separate from the air in the pulsating pressure machine and the air in the means for applying static pressure to the flexible inner containers.

FIG. 12 is a perspective view of a further embodiment having individual covers for the venous fluid reservoir and the arterial fluid reservoir.

FIG. 13 is a perspective view of a further embodiment of the unitary rigid container in which the arterial fluid reservoir is provided with two outlets equipped with oppositely-directed one-way valves. In this embodiment, the arterial fluid reservoir under the influence of the pulsating pressure machine acts as an artificial heart circulating fluid through the cadaveric anatomy or portion of cadaveric anatomy when circulation is achievable between the arteries and veins.

FIG. 14 is a perspective view of an embodiment of a pulsating pressure machine.

FIG. 15 is a side elevation view of the pulsating pressure machine of FIG. 14 along the line 15—15.

DETAILED DESCRIPTION OF THE INVENTION

With reference to FIGS. 1–9, the preferred embodiment of the present invention may be described as follows. The present invention is a new model for surgical training in which vessels in a portion of cadaveric anatomy, preferably human cadaveric anatomy for medical training and animal anatomy for veterinary training, are filled with colored fluid under static and pulsating pressure for arteries and static pressure alone for veins. This model simulates that of live surgery in terms of the capability of bleeding, pulsation, vascular fluid filling, and softness of the tissue and vascular tree. This model allows a trainee to perform many surgical procedures under conditions that resemble live surgery, for example, skin incision and surgical closure, microsurgical dissection, vessel suturing, practicing anastomosis, dissecting and clipping artificial aneurysms, resection of artificial tumors, endoscopic and endovascular procedures, practicing the use of vascular echo-doppler and related techniques, and practicing all kinds of surgical approaches in all surgical disciplines, including both medical and veterinary surgical training.

The following description is based on an embodiment of the present invention in which the cadaveric anatomy is human cadaveric anatomy and particularly, a human cadaveric head 10, however the present invention is not so limited and may be practiced with other portions of cadaveric anatomy or with the entire cadaver, either human or animal. It should be noted that particular portions of cadaveric anatomy may require specific preparation techniques that differ from that of the cadaveric head. For example, the veins of an arm or leg have integral one-way valves which prevent the pooling of blood in the living organism. When the present invention is used with an arm or a leg or any part of the body where the veins have such one-way valves to prevent the reverse flow back to the distal end of the veins, the injection of fluid through the veins from the proximal side of the limb is sometimes impossible. In this situation, a big distal vein like the saphenous vein in the leg, the radial vein, or dorsal veins in the hand can be cannulated and connected to a fluid reservoir to keep the veins filled with fluid.

Figure 1:
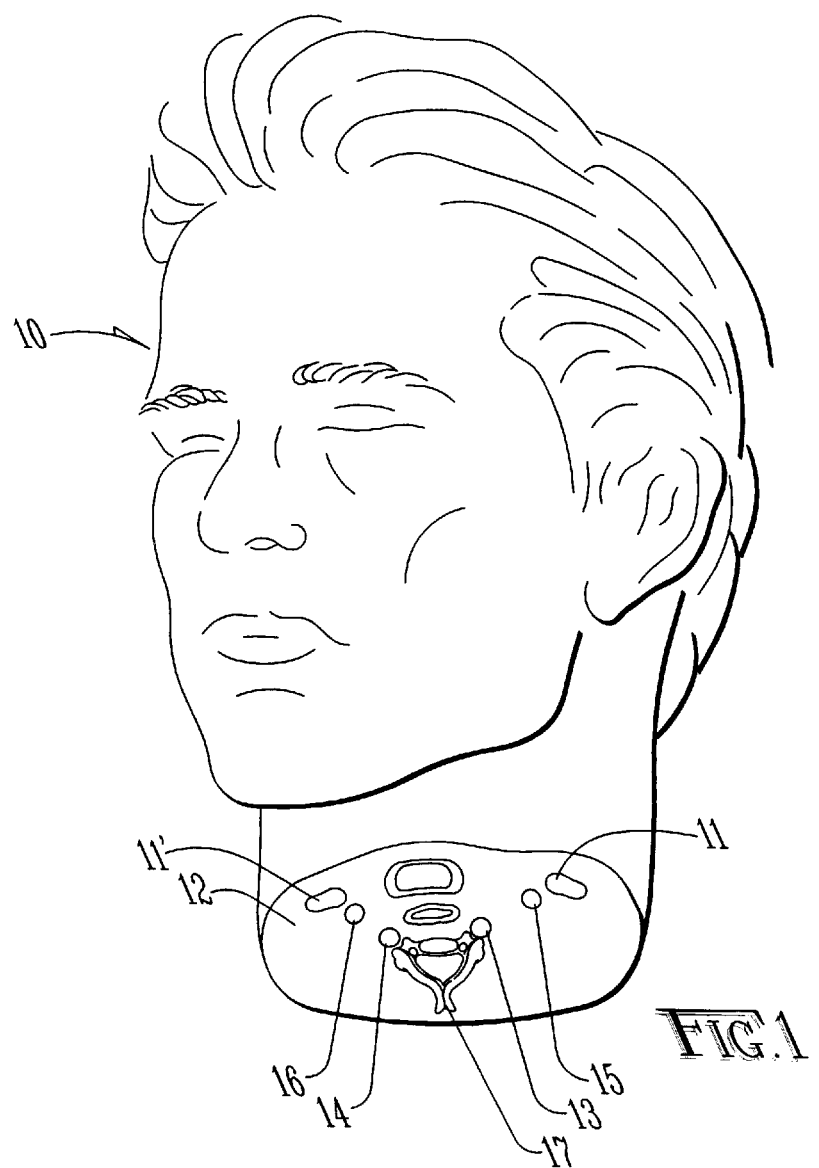
FIG. 1 is a perspective view of a cadaveric head showing a sectioned neck illustrating the major arteries and veins that may be used in the practice of the present invention.

As shown in FIG. 1, the major blood vessels, e.g., the carotid arteries 15, 16, the jugular veins 11 and the vertebral arteries 13, 14, of the cadaveric head 10 are exposed at the sectioned end 12 of the neck of the cadaveric head 10. One or more arteries 13, 15 on one side of the cadaveric head 10 are cannulated. As shown in FIG. 4B, the cannulated artery 13 is connected via tubing 19 to an arterial reservoir 20 containing an artery-filling fluid 21. The artery-filling fluid 21 is colored to simulate the appearance of blood circulating in the arteries of a living body. Typically, the artery-filling fluid 21 will be red in color. The artery-filling fluid 21 may also be mixed with viscous substances to increase its viscosity to mimic the viscosity of blood.

As described below, static pressure is applied to the arterial reservoir 20 at a pressure simulating the static pressure appropriate to that of the living organism from which the cadaveric anatomy is derived. The arterial reservoir 20 is futher connected to a pulsating machine 25 which provides pulsating pressure to simulate the normal pulsations of the arterial system. Various pumps known in the art could be used to create the pulsation. The invention has been successfully practiced with different pumps including the Intra-Aortic Balloon Pump System 90 (Datascope Corp., Fairfield, N.J.; and Heart Mate Drive Console, Thermo Cardiosystems, Inc., Woburn Mass. Another form of pulsating pressure machine 25 is described in more detail below. The artery-filling fluid 21 in the arterial reservoir 20 is maintained at a pressure similar to that in the living organism. However, the pressure is adjustable as needed to accommodate various procedures practiced on, or conditions in, the cadaveric anatomy.

The other exposed arteries, e.g., the arteries 14, 16, in the exposed neck section of the cadaveric head 10 that are not connected to the reservoir are closed so that there is only back and forth flow in the arterial system of the cadaveric head 10 except in response to dissection of the arteries during surgical training. However, in some cases, fresh cadaveric specimens may experience flow from the arteries to the veins and embodiments of the present invention as described below are capable of accommodating this situation.

A vein 11 on one side of the cadaveric head 10 is also cannulated. The cannulated vein 11 is connected via tubing 18 to a venous reservoir 30 containing a vein-filling fluid 32. The vein-filling fluid 32 is colored to simulate the appearance of blood circulating in the veins of a living body. Typically, the vein-filling fluid 32 will be dark red or blue in color. Other veins that are not cannulated in the exposed neck section of the cadaveric head, e.g, vein 11', are closed. It should be understood that other cadaveric specimens, such as an arm or leg, could be used in the practice of the present invention, in which case the arrangment of arteries and veins in the specimen may require different modes of connection. The venous reservoir 30 is maintained at a static pressure similar to that of the normal venous pressure in the living organism to simulate vein filling, but no pulsation is applied. However, the pressure in the venous reservoir 30 may be adjusted if another pressure is desirable for a particular procedure or exercise, for example, the venous pressure could be raised to provoke bleeding for training purposes.

Finally, a clear fluid reservoir 40 communicating with the spinal canal 17 can be connected to the cadaveric head 10 or any other cadaveric anatomy having at least a portion of spinal canal to simulate cerebrospinal fluid. A tube 41 may be introduced into the spinal canal 17 and connected to the clear fluid reservoir 10. The clear fluid reservoir 40 is desirably provided with adjustable gravity flow; for example, it could be a serum bag filed with clear water and suspended for gravity flow. No separate pump or pressurizing device is required, although a pressurized reservoir as described for the arterial or venous fluid reservoirs could be used. A simpler pressurizing device may be obtained by wrapping a serum bag with a pressure bag of the type employed for blood pressure measuring.

To establish static pressure to the arterial system, a commonly available manually-operated pressure bulb 22 with a pressure gauge 23 of the type employed in a sphygmomanometer has been used effectively in the practice of the present invention to provide static pressure to the arterial reservoir 20. The pressure bulb is provided with a one-way valve (not shown), typically at the bottom of the pressure bulb, to allow air into the bulb. Such pressure bulb devices typically also have manually-operated valves. The manually-operated valve is closed to allow the static pressure to be manually pumped to the desired level. Then the manually-operated valve is opened to allow the pulsating pressure from the pulsating machine 25 to pass through into the arterial reservoir 20. Changes in the pressure inside the arterial reservoir 20 are transmitted through connecting tubes 19 to the arterial system of the cadaveric head 10. A pulsating pressure around the normal pressure in the living organism is desirably applied to the arterial reservoir 20. Likewise, a manually-operated pressure bulb 33 and pressure gauge 34 may be applied to the venous reservoir 30 to provide a static pressure similar to that of the venous system of the living organism or greater as desired to keep the veins filled and opened.

As shown in FIGS. 2, 3, 6 and 7, in the preferred embodiment of the invention, the fluid reservoirs 20, 30 comprise a flexible inner container 26, 36, respectively, enclosed within a rigid air-tight outer container 27, 37, respectively. A space 28, 38, respectively, defined between the inner container 26, 36 and the outer container 27, 37 communicates with the source of pressure so as to maintain the flexible inner container at the desired pressure. In the case of the arterial reservoir 20, the pressure is supplied by the manually operated pressure bulb 22 through an opening 29 into the interior space 28, which thereby transmits the desired pressure to the inner container 26 and thus to the artery-filling fluid 21. The pulsations in pressure are provided via the same pathway from the pulsating machine 25. In the case of the venous reservoir 30, the pressure is supplied solely by the manually-operated pressure bulb 33 through an opening 39 into the interior space 38, which thereby transmits the desired pressure to the inner container 36 and thus to the vein-filling fluid 32. The air in the interior spaces 28, 38 is kept separate from the fluids 21, 32.

The colored fluids, either the artery-filling fluid 21 or the vein-filling fluid 32, used in the invention may be water that is colored with food dyes. However, in order to more fully simulate the vascular system, the colored fluids employed in the procedure may be thickened to more closely mimic the viscosity of normal blood. Other colors may be used for particular purposes such as studying the blood supply of a particular anatomical region. For example, a green colored or fluorescent fluid may render the vessels more visible.

Each fluid reservoir 20, 30 desirably comprises an rigid air-tight outer container 27, 37 that is roughly triangular in cross section with a flattened bottom so that it can stably sit on a flat surface. Containers for use with suction devices are known in the art. These devices typically comprise a rigid outer container and a flexible inner container along with various connections to a suction device. The flexible inner liner of such suction containers may be attached to a removable cover which closes an end of the rigid outer container. A suction canister of the type described is sold by Allegiance Healthcare Corporation, McGaw Park, Ill. as product number CAN24-3000. A similar canister is disclosed in U.S. Pat. No. 5,725,516. Such containers, suitably modified, would be acceptable for the practice of some embodiments of the present invention. A cross section of a fluid reservoir 90, representing either an arterial fluid reservoir 20 or a venous fluid reservoir 30, as shown in FIG. 9, illustrates an embodiment of a fluid reservoir 90. A flexible inner container 91 is desirably attached to a cover 92 which in turn snaps-on to the rigid air-tight outer container 93. An air-filled space 94 is thus formed between the walls of the rigid outer container 93 and flexible inner container 91. The space 94 is in communication with the sources of pressure but is not in communication with the interior 95 of the flexible inner container 91; i.e., the air in the space 94 and in the sources of pressure does not intermingle with the fluid in the flexible inner container 91. The interior 95 of the flexible inner container 91 is in fluid communication through a connecting fitting 96 in the cover 92 to a connecting tube 97 to the vein or artery 98 of the specimen of cadaveric anatomy. The connecting tube 97 may include a valve 101 to close off the flow in the tube 97. A suitable valve 101 would be the type of adjustable valve used in intravenous drip devices to adjust the flow through a tube from an IV container to a catheter in the patient. A valve could also be incorporated into the connecting fitting 96. It is desirable that the connecting fitting 96 be low on the reservoir to allow the contents to drain toward the connecting fitting 96. The reservoir may also be mounted at a slope to ensure that the fluid flows toward and covers the outlet of the reservoir. In order to fill the interior 95 of the flexible inner container 91 with vein or artery filling fluid, an opening 99 in the cover 92 is accessible via a removable cap 100.

As described, it is desirable that the rigid outer containers 27, 37 be closed by removable snap-on covers 51, 61, respectively. Various means other than snap-on connections would be acceptable for attaching the covers 51, 61 to the outer containers 27, 37. Each cover 51, 61 may be attached to the respective flexible inner container 26, 36. Alternatively, the flexible inner containers 26, 36 may be attached to the sides of the respective outer containers 27, 37 rather than to the covers 51, 61. In either case, the interiors of the flexible inner containers 26, 36 are not in direct fluid communication with the space 28, 38 between the inner containers 26, 36 and the outer containers 27, 37. Each cover 51, 61 is provided with connection means 52, 62, respectively, which communicate with the interior of the flexible inner containers 26, 36 for fluid connection via tubing 19, 18 to the cannulated arteries and veins, respectively.

As described, each cover 51, 61 may be provided with a large opening with a removable closure 63, such as a snap-on cap, as illustrated in FIG. 6 with respect to the venous reservoir 30. A similar arrangement may be made for the arterial reservoir 20. The large opening and snap-on cap 63 allow for ease in filling the flexible inner containers 26, 36 with fluids 21, 32.

The cover 51, 61 may be provided with a single connection 52, 62 to the connecting tubing to the cannulated arteries or veins, respectively. Alternatively, as shown in FIG. 8, the connection means may include an inlet and an outlet 70, 71 (which may for example be simple tubular projections) for attachment to flexible connecting tubing which is in turn attached to the cannulated arteries or veins of the cadaveric anatomy. The inlet 70 and outlet 71 each include one-way valves such that flow is possible in one direction only through the inlet 70 and in the opposite direction in the outlet 71. Connecting, for example, the aorta and the vena cava or the pulmonary artery and veins in the same specimen, in a two-way connection using the inlet 70 and outlet 71 has the advantage of simulating the actual blood circulation in a human or animal cadaver. This add a wider range of applications to the present invention, especially for the purpose of education. Students in medical and veterinary schools will be able to observe real circulation and fluid behavior in embalmed human or animal specimens without the need to use live animals. If only a single connection is employed, no one-way valve is needed. In most cases, only an embodiment with a single inlet will be used since there will normally be no circulating flow except for a limited back and forth movement in the arteries due to the pulsating pressure applied by the pulsating pressure machine 25. The embodiment with both an inlet 70 and outlet 71 with one-way valves may be used where there is flow between the arteries and veins of the cadaveric anatomy through the capillaries. The existence of flow between the arteries and veins can be determined during the preparation of the specimen of cadaveric anatomy and before the connection of the cadaveric anatomy to the present invention. If this flow does not exist in the specimen and if the flow is necessary for a particular procedure, it can be achieved by making an arterio-venous bypass in the distal vessels of the specimen. Making such a bypass is itself a useful training procedure.

Figure 4A:
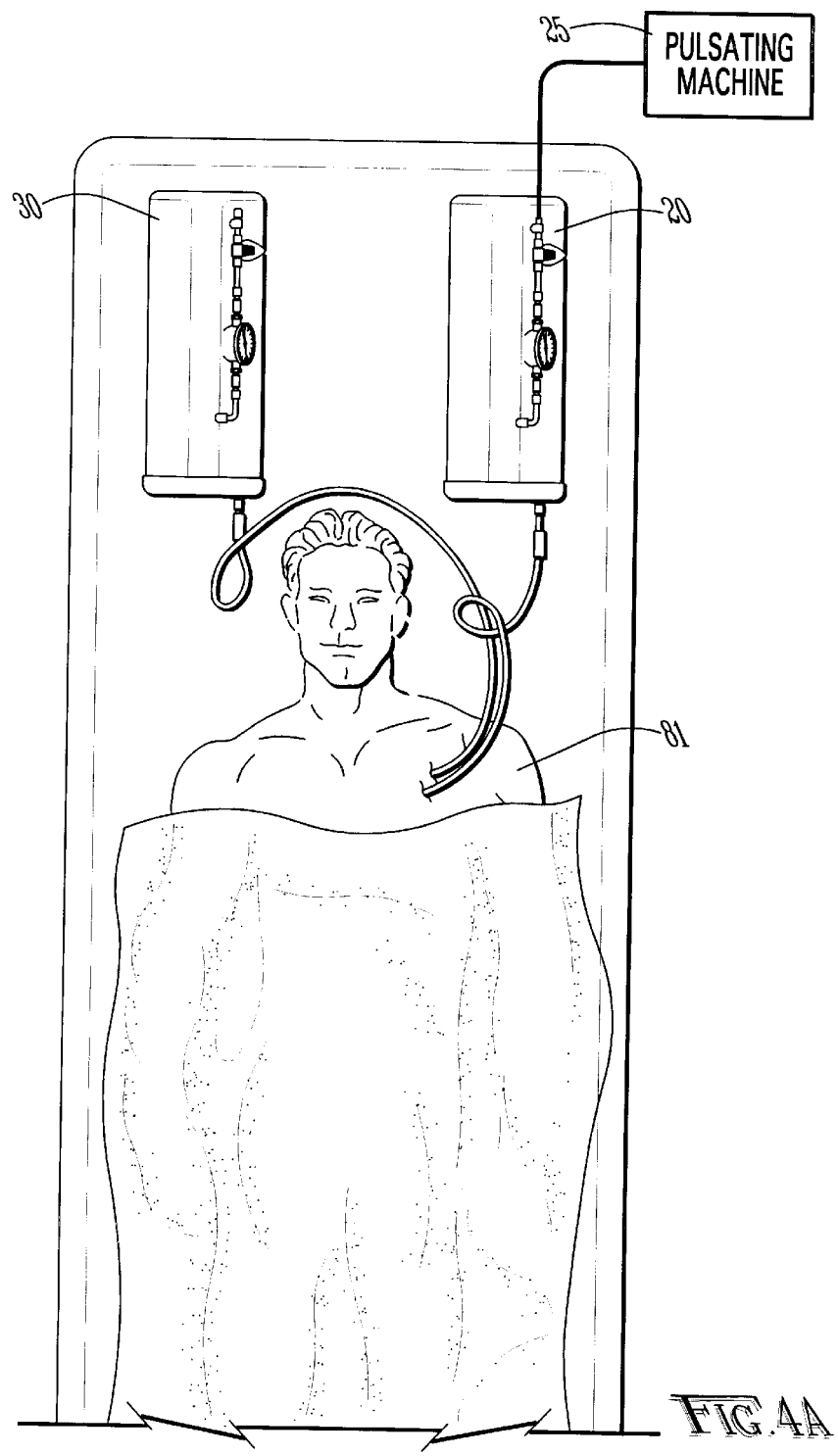
FIG. 4A shows the connection between a pulsating pressure machine and the fluid reservoirs with adjustable pressure to the whole cadaver. A venous fluid reservoir is connected to a major vein and an arterial fluid reservoir is connected to a major artery. A pulsating pressure machine is connected by a tube to the arterial fluid reservoir to produce pulsating pressure in the arterial fluid reservoir. The venous fluid reservoir is under static pressure alone. Either fluid reservoir may be connected to more than one specimen of cadaveric anatomy.
Figure 4B:
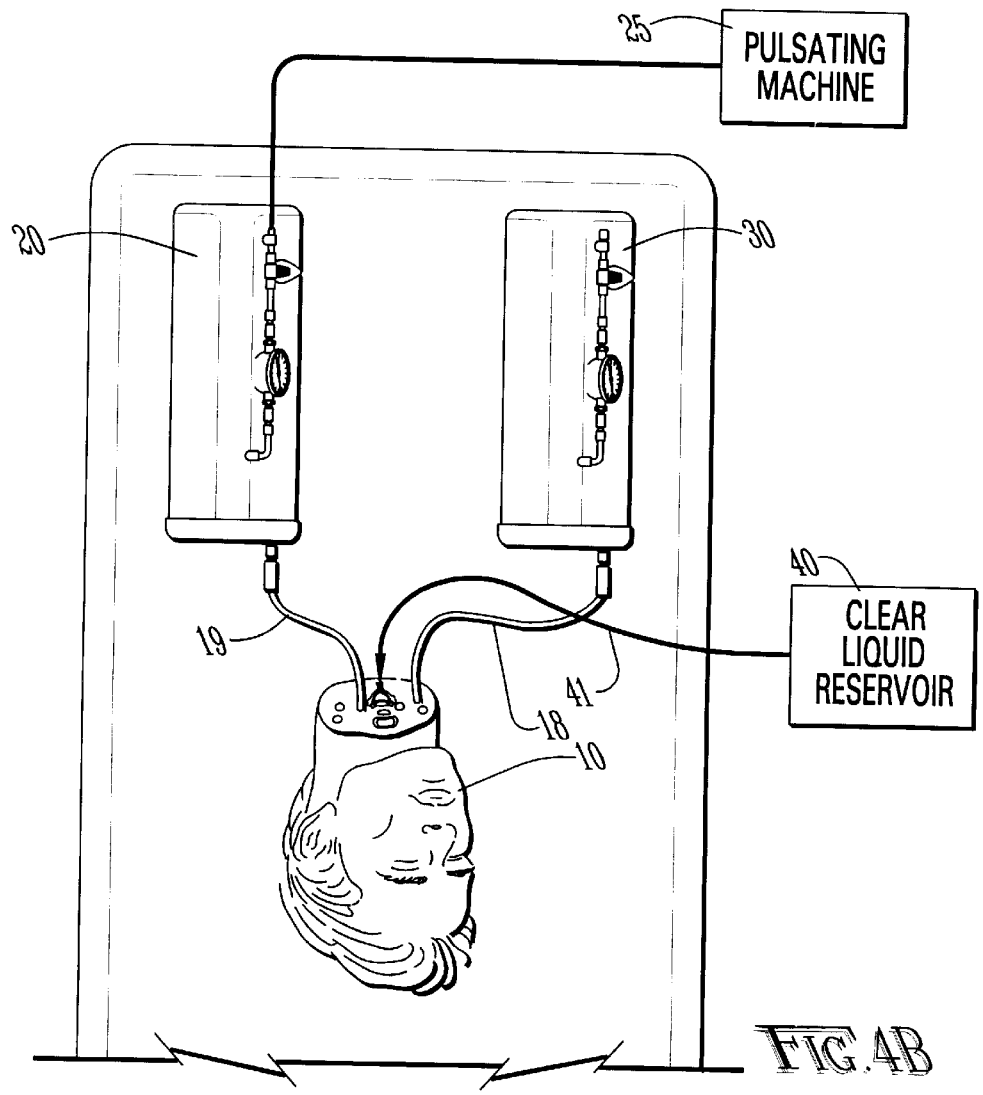
FIG. 4B shows the connection between a pulsating pressure machine and the fluid reservoirs to the cadaveric head. The pulsating pressure machine is connected by a tube to the arterial fluid reservoir to transmit pulsating pressure to the arterial fluid reservoir. The arterial fluid reservoir is connected to the cannulated carotid and/or vertebral artery. The venous fluid reservoir is connected to the jugular vein. A clear fluid reservoir with flow control may be connected to the spinal canal.
Figure 5:
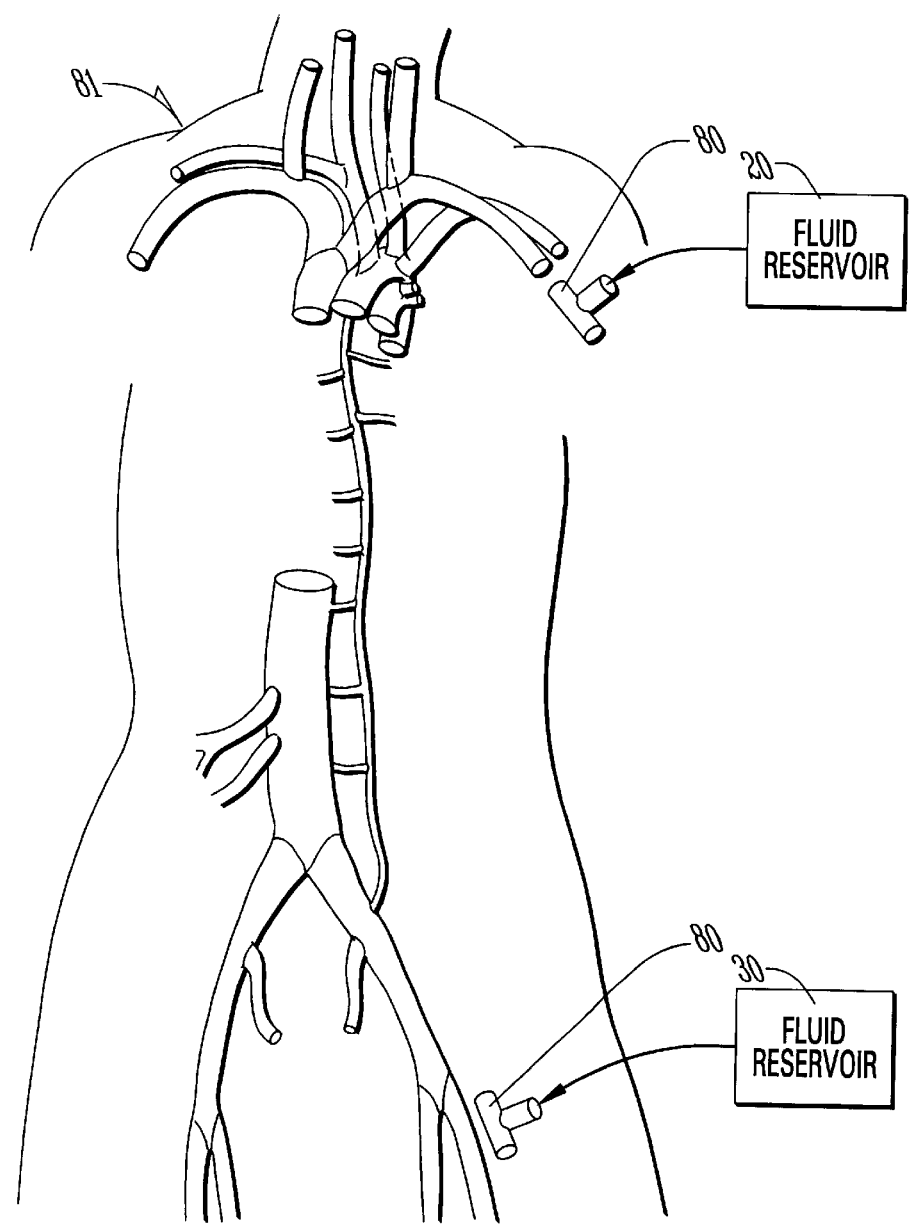
FIG. 5 shows how the method of the present invention may be applied to the whole cadaver using T tubes to connect the blood vessels to the fluid reservoirs. T tubes may be inserted in the subclavian artery and vein or in the femoral artery and vein or through the neck jugular and common carotid or to the aorta and vena cava.

As shown in FIGS. 4A and 5, the present invention may be applied to a whole cadaver 81 using tubes 80 to connect the vessels to the fluid reservoirs. The tubes 80 may be either regular tubes or may be T-tubes as shown in FIGS. 4A and 5. The tubes 80 may be inserted in the subclavian artery and vein or in the femoral artery and vein or through the neck jugular and common carotid or to the aorta and vena cava. In the same manner, the present invention may be connected to a whole animal cadaver.

The apparatus of the present invention may be applied to more than one specimen through multiple connections with the fluid reservoirs.

An alternative embodiment of the present invention is shown in FIGS. 10–11 where the separate fluid reservoirs are incorporated into a unitary rigid airtight container 110 incorporating both an arterial fluid flexible inner container 111 and a venous fluid flexible inner container 112 along with a pulsating pressure machine 113. An external power source 114 supplies the pulsating pressure machine 113 which is connected to the external power source 114 through a power switch 115. The arterial fluid flexible inner container 111 and the venous fluid flexible inner container 112 are in fluid communication with an arterial fluid outlet 116 and a venous fluid outlet 117, respectively, for connection to an artery and a vein of a cadaver or portion thereof. The arterial fluid flexible inner container 111 and the venous fluid flexible inner container 112 are provided with closable openings 118, 119, respectively, to allow filling with arterial fluid or venous fluid.

The unitary rigid container 110 is divided into an arterial fluid compartment 120, a venous fluid compartment 121 and a pressure equipment compartment 122. The arterial fluid compartment 120 and the venous fluid compartment 121 are closed by an air-tight cover 123 (shown in phantom outline in FIGS. 11 and 13 for clarity). The cover 123 is desirably transparent or partially transparent so that the level of fluids in the flexible inner containers 111, 112, may be assessed without opening the cover 123. The cover is preferably hinged along a hinge 124 and capable of being locked by one or more locks 125. The pressure equipment compartment 122 contains the pulsating pressure machine 113 along with an arterial manual pressure bulb 126, arterial pressure gauge 127, venous manual pressure bulb 128 and venous pressure gauge 129 operatively connected together as described above with reference to other embodiments and in communication through outlets 130, 131, to the arterial compartment 120 and venous compartment 121, respectively, so as to apply pressure to the air in the spaces surrounding the flexible inner containers 111, 112, in the same manner as heretofore described. The pulsating pressure machine 113 may be provided with a display 133 to indicate pulse rate. The pulsating pressure machine 113 is shown with a cover and the internal workings are not shown in FIGS. 11 and 13. The pressure equipment compartment 122 is covered by a cover 132 which is preferably transparent or provided with transparent windows 134, 135, 136 to allow the viewing of the arterial pressure gauge 127, venous pressure gauge 129, and pulse rate display 133, respectively. The pulsating pressure machine 113 is operatively connected so as to supply pulsating pressure to the air in the space surrounding the arterial fluid flexible inner container 111; however, for flexibility in operation, the pulsating pressure machine 113 may optionally be operatively connected to the space surrounding the venous fluid flexible inner container 112 so that either compartment 120, 121 may be used as the arterial reservoir. A power switch 115 turns the pulsating pressure machine 113 on and off.

FIG. 12 illustrates an alternative embodiment of the unitary rigid container 110 in which the single cover 123 of FIGS. 10 and 11 is replaced by individual covers 137, 138 to the arterial fluid compartment and the venous fluid compartment, respectively.

FIG. 13 is a perspective view of a further embodiment of the unitary rigid container 110 in which at least one flexible inner container 143 is provided with two outlets 139, 140 equipped with oppositely-directed one-way valves 141, 142. In this embodiment, the flexible inner container 143 is placed under the influence of the pulsating pressure machine 113, which thereby acts as an artificial heart circulating fluid through the cadaver or portion of cadaver and back to the flexible inner container 143. In this situation, only one colored fluid is used. Also, as mentioned above with respect to FIG. 11, the pulsating pressure machine 113 is operatively connected so as to supply pulsating pressure to the air in the space surrounding the arterial fluid flexible inner container 143; however, for flexibility in operation, the pulsating pressure machine 113 may optionally be operatively connected to the space surrounding the venous fluid flexible inner container 112 so that either compartment 120, 121 may be used as the arterial reservoir. This embodiment is analogous to the embodiment described above with respect to FIG. 8.

Figure 16:
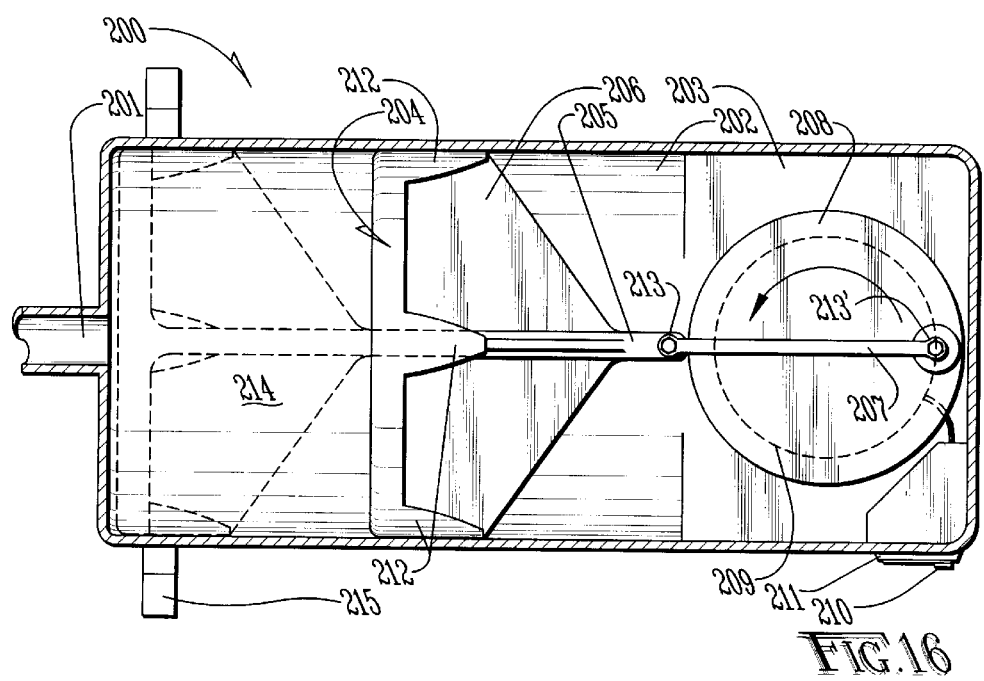
FIG. 16 is a top plan view of the pulsating pressure machine of FIG. 14 along the line 16—16.

With respect to FIGS. 14–16, an embodiment of a pulsating pressure machine 200 may be described. A piston 204 sliding in a cylinder 202 increases and decreases pressure in the air in a space 214 which communicates with an outlet 201. From the outlet 201, the air being pushed in and out by the sliding piston is introduced into the space surrounding the flexible inner container as described heretofore to produce a pulsating pressure in the flexible inner container of the arterial reservoir. The cylinder 202 is supported on a base 215. The piston 204 is held in proper alignment in the cylinder 202 by supporting members 212 which are attached to the piston 204 and slide along the walls of the cylinder 202. A rigid arm 205 extends from the center of the piston 204 in the direction opposite to the outlet 201 and is held in position by reinforcing members 206 which extend between the rigid arm 205 and the supporting members 212. A housing 203 is attached to the end of the cylinder 202 opposite to the outlet 201. The housing encloses an electric motor 209 which is operatively connected to a switched electric power source 210. The electric motor 209 is provided with a speed control 211 which desirably includes a readout of the revolutions per minute of the electric motor 209. The electric motor 209 spins a revolving disk 208. A pivoting arm 207 is pivotally connected at one end to the edge of the revolving disk 208 at pivot 213'. The other end of the pivoting arm 207 is pivotally connected to the rigid arm 205 at connecting joint 213. The action of the electric motor 209 spinning the revolving disk 208 causes the pivoting arm 207 to impart a back-and-forth motion to the rigid arm 205 and thus the piston 204. A pulsating pressure is therefore created in the air in the space 214, which is communicated to the outlet 201 and therefore to the space surrounding a flexible inner container and thence to a cadaveric specimen as described heretofore. This type of pulsating pressure machine 200 has the advantage over other types of pumps, such as peristaltic action pumps, in that it does not require direct fluid communication between the air in the pump and the arterial and venous fluids circulating in the cadaveric specimen. When the pulsating pressure machine 200 is disconnected from the fluid reservoirs, the outlet 201 may be equipped with a cover (not shown) or similar mechanism to close off the space 214.

EXAMPLE 1

Preparation of Cadaveric Heads

Preparation of the cadaveric specimens was similar to known methods (Sanan A, Abdel Azez K M, Janjua R M, van Loveren H R, Keller, J T: Colored silicone injection for use in neurosurgical dissection: anatomic technical note. Neurosurgery 45:1267–1274, 1999., Smith R, Rhoton A L Jr: Comment. Neurosurgery 45:1272–1273, 1999). The common carotid arteries, vertebral arteries, and internal jugular veins were exposed by dissecting 1 to 2 cm of each vessel to allow cannulation. Plastic tubes that fit the caliber of each vessel were inserted and tied to the vessel's wall. Care was taken to maintain flow to both the internal and external carotid arteries. In addition, one 8- to 10-gauge tube was inserted intradurally into each side of the spinal canal and advanced to reach the intracranial subarachnoid space, then the canal was plugged with bone wax.

Tap water was used to irrigate and flush the vessels repeatedly to remove clots, tissue debris, and formalin fixative. Each vessel was irrigated separately until the return fluid was consistently clear. The subarachnoid space was washed via the tubes in the spinal canal. Any leaks from arteries and veins on the sectioned surface of the neck were sealed either by ligation or coagulation.

EXAMPLE 2

Preparation of Colored Fluid and Operating the System

We used tap water and food coloring to prepare red and dark red fluid. The containers of colored fluid were soft and flexible (serum bags worked well). The arteries were injected with red fluid through the carotid and vertebral arteries on one side until flow appeared on the other side. At this point, we closed the opposite carotid and vertebral arteries and continued injecting both ipsilateral arteries simultaneously, applying moderate pressure to open and fill the terminal branches, then closing the ends. The same was done with the jugular veins.

The pressure bag of the red reservoir was then connected to the pulsating device that provides a pulsating pressure that could be transmitted into the red fluid reservoir through the pressure bag. A rate of 60 pulses per minute was selected. The machine provided a rate of 60 to 120 pulses per minute. Pressure of up to 150 mm Hg could be applied through the pressure bag to the source of the red fluid. We applied a pressure of 80 mm Hg as a baseline because the pressure jumped with each pulse in the same way as systolic pressure due to the pulsating pressure provided by the pump. The arteries on the other side were kept closed.

The jugular vein on one side was connected to the dark red fluid reservoir and the contralateral jugular remained closed. A pressure between 15 to 25 mm Hg was applied through the pressure bag. The fluid reservoirs were placed at the same level or a few centimeters higher than the specimen to control the pressure and prevent air embolisms in the vessels during dissection. It is possible to create circulating flow through the circle of Willis by connecting the opposite carotid or vertebral artery through a tube with one way valve back into the reservoir. For practicing on more distal arteries, however, there is no advantage of closing the cycle. There is no real arterial venous circulation that exists under this pressure. The actual movement of the fluid inside the arteries in our model was back and forth according to the pulse transmitted from the pump, while the fluid inside the veins was static but under pressure. One of the tubes inside the spinal canal was then connected to a serum bag filled with clear fluid, the flow rate of the fluid was adjusted as desired. The other tube was connected to another fluid container near the specimen to receive the fluid running through the subarachnoid space.

To get the maximum benefit from the specimen and perform all possible procedures before the vessels are destroyed, we started with endoscopic and other procedures that could be done on the surface and worked gradually to the depth. All of the training procedures other than craniotomies were performed under the operating microscope.

EXAMPLE 3

Craniotomy

A large scalp flap was made to allow a variety of approaches. The superficial temporal artery (STA) was preserved for practice of the STA-MCA bypass. Any bleeding vessels were ligated, coagulated, or clamped by Raney clips. According to the intended procedure, a variety of craniotomies were performed, with care to preserve the underlying dura. The edges of the bone were waxed to prevent a fluid leak. The dura was opened and leaking vessels were coagulated.

EXAMPLE 4

Cisternal and Vascular Dissection

The exposed brain was lifelike, with pulsation and fluid filled cisterns, the arteries were red and pulsating, the veins were darker and filled, and a clear fluid simulated the release of cerebrospinal fluid when the arachnoid was opened. The sylvian fissure was split, the branches of the MCA was followed down to the carotid and basal cisterns, dissecting the branches of the circle of Willis, and exposing all the neurovascular structures in the skull base.

EXAMPLE 5

Vascular Suturing and Anastomosis

A variety of exercises were performed, starting with establishment of STA-MCA bypass (end-to-side anastomosis), repair of a longitudinal incision or a partial arterial defect, a transected artery (end-to-end anastomosis) and segmental arterial replacement. These were performed on the cortical branches of the MCA artery, and the M2 and M3 branches deep in the fissure. We used various segments of these branches. Each segment was dissected for about 1 cm of its length from the overlying arachnoid membrane. Small branches were coagulated and disconnected to free the segment. Two vascular clips were applied on both sides of the segment, arteriotomies were performed according to the kind of repair or anastomosis desired. After suture completion, the temporary clips were released, establishing flow under pressure allowing to detect the integrity and patency of the anastomoses. Some specimens have a remnant thrombus inside the branches of MCA that allowed the performance of the thrombectomy and re-suturing of the vessels. After making an anastomosis and suturing the vessels, a micro Doppler may be used to test the flow rate in the distal vessel and across the segment that has been sutured. This reveals information about the patentcy of the anastomosis and the suturing and also about the degree of narrowing due to the placement of sutures at the site of the anastomosis. This also provides an opportunity to practice how to discover air embolisms and irregular flow.

EXAMPLE 6

Aneurysm Applications

Artificial aneurysms can be created in several ways, we found the better one is created by using a venous graft, such as the sylvian vein connected by end to side anastomosis to a major arterial branch. Variously shaped aneurysms can be established according to the venous segment and its preparation. Clipping, coagulating, and manipulation of aneurysms were practiced on the same anatomy and nearly the same condition in real surgery, aneurysmal rupture was performed by puncturing the aneurysm allowing crisis management under high pressure bleeding.

EXAMPLE 7

Resection of Artificial Tumors and Other Procedures

Gelatin material was injected in different locations of the basal cisterns and intraparenchyma to represent a tumor mass. Resection of these masses out of its locations and preserving the neurovascular structures was practiced. Skull-base approaches and intraparenchymal resection and other procedures which are usually performed using cadavers prepared in traditional methods were practiced as well.

EXAMPLE 8

Endoscopic Procedures

After a frontal burr hold was made, the endoscope sheath was introduced toward the right lateral ventricle. The optic was introduced after polling out the introducer, the choroid plexus and the septal and thalamic veins led the way to the foramen of Monro, the endoscope then passed the foramen into the third ventricle, the mamillary bodies and the infendebulom recess were identified. The floor of the third ventricle was then perforated in front of the basilar bifurcation in the tuber cinerum aria. The basilar trunk and branches were identified in the interbeduncular cistern. Practicing irrigation and clearing the fluid inside the ventricles, observing the pulsation of the basilar, and identifying the fluid flow through the fenestra was achieved.

All above mentioned procedures were performed on the other side, the MCA was closed on this side and all ruptured veins were coagulated or sutured. The carotid and the jugular vein on the other side were connected to the colored fluid reservoirs. (Changing the connections of the vertebral artery and the jugular vein with the fluid reservoir from side to side had no impact.) The same procedures were then done on the other side in addition to interhemispheric approaches.

When all possible training procedures on the anterior circulation were done, the carotid artery was disconnected and the posterior communicating arteries were clipped on both sides proximal to the posterior cerebral arteries. The vertebral artery from one or both sides was connected to the red fluid reservoir and one of the jugulars was connected to the dark red fluid source. Dissection of the posterior fossa and posterior circulation in addition to the same previously mentioned procedures were then done through the occipital and suboccipital approaches.

We also applied this method on a whole brain specimen (autopsy brain), in this case both carotid arteries were cannulated, allowing a variety of vascular exercises on the major branches.

The present invention may be practiced on other portions of cadaveric anatomy or with the whole cadaver. When the whole cadaver is used, in addition to cannulating the end of the sectioned arteries and veins, T tubes may be used to connect the fluid reservoirs (via the leg of the T tube) to the major veins and arteries (via the cross piece of the T tube). For example, a T tube may be inserted into the carotid artery to connect the arterial system to the arterial fluid reservoir and another into the jugular vein to connect the venous system to the venous fluid reservoir. Alternatively, T tubes may be inserted into the femoral artery and vein, the neck jugular and common carotid, the aorta and vena cava, the brachial artery and vein, or the subclavian artery and vein.

The fluid reservoirs of the present invention may be used with more than one portion of cadaveric anatomy by providing multiple points of connection from the fluid reservoirs.

This model can increase the capacity of surgical laboratories for training on a variety of surgical approaches, including skull-base, neurovascular, endoscopic, and even endovascular procedures. Also, surgical procedures on any part of the body or on separate organs may be practiced using the present invention. Clear fluid in the subarachnoid spaces, pulsation, and vascular filling give greater reliability to these training procedures. This model provides a unique opportunity to practice hemostasis, management of bleeding, and the paramount of surgical training under crisis conditions such as ruptured aneurysms, ruptured arteries and excessive bleeding, that is not available in any alternative model. Similar opportunities of training can be offered to all surgical disciplines as the system can be used on other organs or on whole cadavers.

One cadaveric head provides an opportunity for numerous training procedures. Trainees can practice on the same specimen for a long time as long as the specimen has been embalmed. Training on anesthetized animals allows time for only a few procedures.

The training procedures that may be used in conjunction with the present invention include skin incisions and craniotomies; coagulation, hemostasis and management of bleeding; tissue and vascular dissection; artificial aneurysm creation, clipping, coagulation and manipulation; resection of artificial tumors; endoscopic procedures; endovascular and angioscopic procedures; education and training of medical and nursing school students in invasive procedures, such as venipuncture, venous and arterial lines, and studying the circulation of an organ; and resident training on jugular, femoral and subclavian catheter insertion. Not only training procedures can be applied to this method, we can study the hemodynamic features of the vascular tree, the blood supply of anatomical regions, collateral and vascular alignments, and actual relation between neurovascular structures inside the skull or any other part of the body. The present invention may also be used for testing new endovascular catheters and other devices, particularly those related to the vascular system. When used in conjunction with animal cadavers, the present invention may be useful in the training of veterinary surgeons.

The apparatus of the present invention may be used with artificial models and manikins having silicon tubing in place of blood vessels. Such models are disclosed in U.S. Pat. Nos. 6,062,866; 5,320,537; 4,182,054; and 5,215,469.

In order to obtain the most realistic model of live surgery, two characteristics of the cadaveric anatomy may need to be addressed. First, the stiffness of the formalin-fixed specimen make exposure and retraction somewhat difficult and sometimes troublesome. It may be necessary to apply the model on a softer specimen preserved by glycerin, alcohol and other fixation methods or using fabric softener materials that make the specimen soft and retractable. (Satish, K, M.D., Stephen K. P, M.D. The use of Fabric Softener in Neurosurgical Prosections. Neurosurgery 36:420–424, 1995.)

Second, coagulation of the cadaveric vessels without vascular tone and a blood coagulation mechanism made hemostasis by coagulation a tedious matter, although this characteristic might be favorable in a training situation. This situation might be dealt with by altering the nature and viscosity of the fluid to give it coagulation characteristics more similar to blood.

Although the preferred embodiments of the present invention are described with reference to human cadaveric anatomy, the method and apparatus of the present invention may be used with animal cadaveric anatomy also when training procedures and exercises that do not require actual human anatomy are practiced. The preferred and alternative embodiments described herein are intended to be exemplary only and not limiting to the full scope of the present invention as set forth in the appended claims.

What is claimed is:

1. An apparatus for surgical training on at least a portion of cadaveric anatomy having at least one major artery and at least one major vein, comprising:
   a reservoir of artery-filling fluid, said artery-filling fluid having a first color simulating the appearance of blood circulating in the arteries of a living organism from which said cadaveric anatomy is derived;
   a reservoir of vein-filing fluid, said vein-filling fluid having a second color simulating the appearance of blood circulating in the veins of a living organism from which said cadaveric anatomy is derived;
   means for applying to said reservoir of artery-filling fluid a static arterial pressure simulating the arterial pressure appropriate to that of a living organism from which said cadaveric anatomy is derived;
   a pulsating pressure machine for generating pulsating pressure fluctuations and means for transmitting said pulsating pressure fluctuations to said reservoir of artery-filling fluid whereby the pressure of said reservoir of artery-filling fluid pulsates to simulate the pulsations of the arteries of a living organism from which said cadaveric anatomy is derived;
   means for applying to said reservoir of vein-filling fluid to a static venous pressure simulating the venous pressure appropriate to a living organism from which said cadaveric anatomy is derived;
   means adapted for connecting said artery-filling reservoir to said at least one major artery; and
   means adapted for connecting said vein-filling reservoir to said at least one major vein;
   wherein said reservoir of artery-filling fluid comprises a flexible inner container having an inner volume containing said artery-filling fluid and means for communication between said flexible inner container and said means adapted for connecting said artery-filling reservoir to said at least one major artery, a rigid air-tight outer container enclosing said flexible inner container, a space defined between said flexible inner container and said rigid air-tight outer container, and means for communication between said space and said means for applying to said reservoir of artery-filling fluid a static arterial pressure and between said space and said pulsating pressure machine;
   wherein said reservoir of vein-filling fluid comprises a flexible inner container having an inner volume containing said vein-filling fluid and means for communication between said flexible inner container and said means adapted for connecting said vein-filling reservoir to said at least one major vein, a rigid air-tight outer container enclosing said flexible inner container, a space defined between said flexible inner container and said rigid air-tight outer container, and means for communication between said space and said means for applying to said reservoir of vein-filling fluid to a static venous pressure; and
   wherein said pulsating pressure machine comprises means for generating pulsating pressure fluctuations in air and means for transmitting said pulsating pressure fluctuations to said space in said reservoir of artery-filling fluid.

2. The apparatus of claim 1, wherein said at least a portion of cadaveric anatomy has at least a portion of spinal canal, further comprising a clear fluid reservoir containing a clear fluid and means for connecting said clear fluid reservoir to said at least a portion of spinal canal and means for adjusting a flow rate of said clear fluid from said clear fluid reservoir.

3. The apparatus of claim 1 wherein said first color is red.

4. The apparatus of claim 1, wherein said second color is dark red.

5. The apparatus of claim 1, wherein said second color is blue.

6. The apparatus of claim 1, wherein said at least a portion of cadaveric anatomy is human cadaveric anatomy.

7. The apparatus of claim 1, wherein said at least a portion of cadaveric anatomy is animal cadaveric anatomy.

8. The apparatus of claim 1, wherein said rigid outer container of reservoir of artery-filling fluid and said rigid outer container of said reservoir of vein-filling fluid comprise a unitary rigid container.

9. The apparatus of claim 8 wherein said unitary rigid container further comprises a compartment for containing said pulsating pressure machine.

10. An apparatus for surgical training on at least a portion of cadaveric anatomy having at least one major artery and at least one major vein, comprising:

a reservoir of fluid, said fluid having a color simulating the appearance of blood circulating in a living organism from which said cadaveric anatomy is derived;

means for applying to said reservoir a static pressure appropriate to blood circulating in a living organism from which said cadaveric anatomy is derived;

a pulsating pressure machine for generating pulsating pressure fluctuations and means for transmitting said pulsating pressure fluctuations to said reservoir whereby the pressure of said reservoir pulsates to simulate the pulsations of the arteries of a living organism from which said cadaveric anatomy is derived;

means adapted for connecting said reservoir to said at least one major artery, said means comprising a one-way valve oriented to allow flow from said reservoir to said at least one major artery; and means adapted for connecting said reservoir to said at least one major vein, said means comprising a one-way valve oriented to allow flow from said at least one major vein to said reservoir;

wherein said reservoir comprises a flexible inner container having an inner volume containing said fluid and means for communication between said flexible inner container and said means adapted for connecting said reservoir to said at least one major artery and said means adapted for connecting said reservoir to said at least one major vein, a rigid air-tight outer container enclosing said flexible inner container, a space defined between said flexible inner container and said rigid air-tight outer container, and means for communication between said space and said means for applying to said reservoir a static arterial pressure and between said space and said pulsating pressure machine; and wherein said pulsating pressure machine comprises means for generating pulsating pressure fluctuations in air and means for transmitting said pulsating pressure fluctuations to said space in said reservoir.

11. The apparatus of claim 10, wherein said at least a portion of cadaveric anatomy has at least a portion of spinal canal, further comprising a clear fluid reservoir containing a clear fluid and means for connecting said clear fluid reservoir to said at least a portion of spinal canal and means for adjusting a flow rate of said clear fluid from said clear fluid reservoir.

12. The apparatus of claim 10 wherein said color is red.

13. The apparatus of claim 10, wherein said color is dark red.

14. The apparatus of claim 10, wherein said color is blue.

15. The apparatus of claim 10, wherein said at least a portion of cadaveric anatomy is human cadaveric anatomy.

16. The apparatus of claim 10, wherein said at least a portion of cadaveric anatomy is animal cadaveric anatomy.

* * * * *